(12) United States Patent
Li et al.

(10) Patent No.: US 8,366,004 B2
(45) Date of Patent: Feb. 5, 2013

(54) BARCODE DETECTION BASED ON MORPHOLOGICAL OPERATIONS

(75) Inventors: Hsiang-Tsun Li, San Diego, CA (US); Jingqiang Li, San Diego, CA (US); Hau Hwang, San Diego, CA (US); Xiaoyun Jiang, San Diego, CA (US); Joseph Cheung, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1079 days.

(21) Appl. No.: 12/035,653

(22) Filed: Feb. 22, 2008

(65) Prior Publication Data

US 2009/0212112 A1  Aug. 27, 2009

(51) Int. Cl.
*G06K 5/04* (2006.01)
(52) U.S. Cl. .................. 235/462.12; 235/462.1
(58) Field of Classification Search .............. 235/462.12
See application file for complete search history.

(56) References Cited

U.S. PATENT DOCUMENTS

| | | | |
|---|---|---|---|
| 5,120,940 A | 6/1992 | Willsie | |
| 5,698,833 A | 12/1997 | Skinger | |
| 6,173,893 B1 * | 1/2001 | Maltsev et al. | 235/462.09 |
| 6,330,975 B1 | 12/2001 | Bunte et al. | |
| 6,366,696 B1 | 4/2002 | Hertz et al. | |
| 6,585,159 B1 | 7/2003 | Meier et al. | |
| 6,708,884 B1 | 3/2004 | Su et al. | |
| 6,832,729 B1 | 12/2004 | Perry et al. | |
| 6,941,026 B1 * | 9/2005 | Nadabar et al. | 382/265 |
| 7,127,124 B2 | 10/2006 | Tanaka | |
| 7,156,311 B2 | 1/2007 | Attia et al. | |
| 7,328,847 B1 | 2/2008 | Shen et al. | |
| 7,475,823 B2 | 1/2009 | Brock et al. | |
| 7,637,433 B1 | 12/2009 | Zhu et al. | |
| 7,784,696 B2 | 8/2010 | Wang | |
| 2002/0181762 A1 | 12/2002 | Silber | |

(Continued)

FOREIGN PATENT DOCUMENTS

GB     2227589 A    8/1990
WO     WO03030082 A1  4/2003

(Continued)

OTHER PUBLICATIONS

European Search Report—EP2093696—European Search Authority the Hague—Apr. 1, 2009.

(Continued)

*Primary Examiner* — Thien M Le
*Assistant Examiner* — Tae Kim
(74) *Attorney, Agent, or Firm* — James R. Gambale, Jr.

(57) ABSTRACT

This disclosure describes techniques for detecting a barcode within an image. An image processor may, for example, process an image to detect regions within the image that may be barcodes. The image processor may identify regions of the image that exhibit a high concentration of edges and a high concentration of pixels with low optical intensity co-instantaneously as potential barcodes. The image processor may identify the regions using a number of morphological operations. The image processor may then determine whether the identified regions are actually barcodes by verifying whether the region have unique barcode features. The barcode detection techniques described in this disclosure may be independent of barcode size, location and orientation within the image. Moreover, the use of morphological operations results in faster and more computationally efficient barcode detection, as well as lower computational complexity.

30 Claims, 11 Drawing Sheets

U.S. PATENT DOCUMENTS

| | | |
|---|---|---|
| 2003/0016297 A1 | 1/2003 | Shigeta |
| 2004/0020989 A1 | 2/2004 | Muramatsu |
| 2004/0080650 A1* | 4/2004 | Hwang et al. ............ 348/308 |
| 2005/0011957 A1 | 1/2005 | Attia et al. |
| 2005/0203854 A1 | 9/2005 | Das et al. |
| 2006/0202039 A1 | 9/2006 | Wang et al. |
| 2006/0202040 A1 | 9/2006 | Wang et al. |
| 2006/0274171 A1 | 12/2006 | Wang |
| 2007/0063050 A1 | 3/2007 | Attia et al. |
| 2009/0001165 A1 | 1/2009 | Zhang et al. |
| 2009/0212113 A1 | 8/2009 | Chiu et al. |

FOREIGN PATENT DOCUMENTS

| | | |
|---|---|---|
| WO | WO2005124657 A1 | 12/2005 |

OTHER PUBLICATIONS

International Search Report/Written Opinion—PCT/US09/034799—International Search Authority EPO—Apr. 7, 2009.

* cited by examiner

BARCODE DETECTION BASED ON MORPHOLOGICAL OPERATIONS

TECHNICAL FIELD

The disclosure relates to image processing and, more particularly, techniques for detecting barcodes within images.

REFERENCE TO CO-PENDING APPLICATION FOR PATENT

The present Application for Patent is related to the following co-pending U.S. Patent Application entitled "IMAGE CAPTURE DEVICE WITH INTEGRATED BARCODE SCANNING" by Chinchuan Andrew Chiu, Ser. No. 12/035,644 filed concurrently herewith, assigned to the assignee hereof, and expressly incorporated by reference herein.

BACKGROUND

A barcode is a machine-readable representation of information in the form of one or more patterns. Conventional one-dimensional barcodes represent information in the form of a series of parallel, adjacent bars of various widths and spacings. Barcodes have expanded, however, to represent information in a number of other patterns, such as patterns of dots, concentric circles and the like. These other patterns may include shapes arranged in one-dimensional (1D) or two-dimensional (2D) patterns.

Barcodes may be used to identify, track, inventory and price items. Typically, barcodes are used to associate an identification number to a type of item using a database or other tracking system. Barcodes, however, have recently begun to be used for encoding a wide variety of information associated with the item to which it is attached or to other related items. Barcodes have thus emerged as a way of communicating information for purposes unrelated to the traditional uses. Consequently, consumers, rather than solely retailers, have begun to embrace the efficiency with which barcodes can convey information.

SUMMARY

This disclosure describes techniques for detecting a barcode within an image. Barcodes have particular distinguishing characteristics that make them particularly susceptible to detection. Barcodes may be formed as patterns of dark (e.g., black) and light (e.g., white) bars, circles, dots or other shapes. The barcode patterns include a number of edges created by the spacing of the bars, circles, dots or other shapes of the patterns. The barcode patterns also include a number of regions of low optical intensity due to the black color (or other dark color) of the bars, circles, dots or other shapes of the patterns. Not only do barcodes include a number of edges and low intensity pixel values, but the edges and low intensity regions are co-instantaneous, i.e., exist at the same time.

A barcode detection module processes a digital image to identify one or more edges representing high contrast transitions in intensity within the image. The barcode detection module also processes the digital image to identify regions of the digital image with low optical intensity. The barcode detection module then identifies locations within the digital image that exhibit both a high concentration of identified edges and a high concentration of identified regions with low optical intensity as candidates for being a barcode. In some aspects, the barcode detection module may identify these locations using one or more morphological operations. The barcode detection module may then determine whether the candidate locations are actually barcodes by verifying whether the candidate locations have unique barcode features, such as a barcode finder pattern of a particular barcode symbology.

In one aspect, a method comprises identifying transitions in intensity that exceed an intensity transition threshold as edges within a digital image of a scene of interest, identifying regions of the digital image with luminance intensity below an intensity threshold as low intensity regions, and detecting a barcode within the digital image based on the identified edges and the identified low intensity regions.

In another aspect, a device comprises a processor including a barcode detection module that identifies transitions in intensity that exceed an intensity transition threshold as edges within a digital image of a scene of interest, identifies regions of the digital image with luminance intensity below an intensity threshold as low intensity regions, and detects a barcode within the digital image based on the identified edges and the identified low intensity regions.

In another aspect, a computer-readable medium comprises instructions to cause a processor to identify transitions in intensity that exceed an intensity transition threshold as edges within a digital image of a scene of interest, identify regions of the digital image with luminance intensity below an intensity threshold as low intensity regions, and detect a barcode within the digital image based on the identified edges and the identified low intensity regions.

In another aspect, a device comprises means for identifying transitions in intensity that exceed an intensity transition threshold as edges within a digital image of a scene of interest, means for identifying regions of the digital image with luminance intensity below an intensity threshold as low intensity regions, and means for detecting a barcode within the digital image based on the identified edges and the identified low intensity regions.

The techniques described in this disclosure may be implemented in hardware, software, firmware, or any combination thereof. If implemented in software, the software may be executed in a processor, which may refer to one or more processors, such as a microprocessor, application specific integrated circuit (ASIC), field programmable gate array (FPGA), or digital signal processor (DSP), or other equivalent integrated or discrete logic circuitry. Software comprising instructions to execute the techniques may be initially stored in a computer-readable medium and loaded and executed by a processor. Accordingly, this disclosure also contemplates computer-readable media comprising instructions to cause a processor to perform any of a variety of techniques as described in this disclosure. In some cases, the computer-readable medium may form part of a computer program product, which may be sold to manufacturers and/or used in a device. The computer program product may include the computer-readable medium, and in some cases, may also include packaging materials.

The details of one or more aspects are set forth in the accompanying drawings and the description below. Other features, objects, and advantages of the techniques will be apparent from the description and drawings, and from the claims.

DETAILED DESCRIPTION

Figure 1:
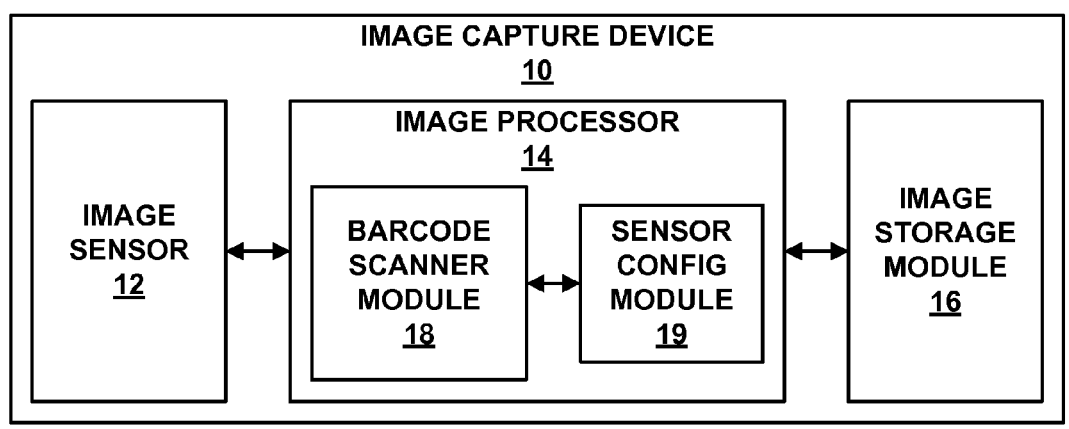
FIG. 1 is a block diagram of an example image capture device that implements the barcode scanning techniques described in this disclosure.

FIG. 1 is a block diagram of an example image capture device 10 that implements the barcode detection techniques described in this disclosure. Image capture device 10 may be a digital camera, such as a digital still image camera, a digital video camera, or a combination of both. In addition, image capture device 10 may be a stand-alone device, such as a stand-alone camera, or be integrated in another device, such as a wireless communication device. As an example, image capture device 10 may be integrated in a mobile phone to form a so-called camera phone or video phone. Although the techniques described in this disclosure may be generally applicable to captured digital video, application of such techniques to digital still images will be described for purposes of illustration.

As shown in FIG. 1, image capture device 10 includes an image sensor 12, an image processor 14 and an image storage module 16. Image sensor 12 captures still images, or possibly full motion video sequences, in which case the barcode detection techniques may be performed on one or more image frames of the video sequence. Image sensor 12 may include a two-dimensional array of individual image sensor elements, e.g., arranged in rows and columns. In some aspects, each of the image sensor elements of image sensor 12 may be associated with a single pixel. In other words, there may be a one-to-one correspondence between image sensor elements and pixels. Alternatively, there may be more than one image sensor element associated with each pixel or more than one pixel associated with each image sensor element. Image sensor 12 may comprise, for example, an array of solid state sensors such as complimentary metal-oxide semiconductor (CMOS) sensors, charge coupled device (CCD) sensors or the like. Moreover, image sensor 12 may maintain one or more image buffers to which it stores image information during image acquisition.

To capture the digital image, image sensor 12 exposes the image sensor elements to the image scene to capture the digital image. The image sensor elements within image sensor 12 may, for example, capture intensity values representing the intensity of the light of the scene at a particular pixel position. In some cases, each of the image sensor elements of sensor 12 may only be sensitive to one color, or color band, due to the color filters covering that element. For example, image sensor 12 may comprise for example, an array of red, green, and blue (RGB) filters. Image sensor 12 may utilize other color filters, however, such as cyan, magenta, yellow, and black (CMYK) color filters. Thus, each of the image sensor elements of image sensor 12 may capture intensity values for only one color. Thus, the image information may include pixel intensity and/or color values captured by the sensor elements of image sensor 12.

Image capture device 10 may operate in numerous image capture modes, such as a default or normal mode (sometimes also referred to as an "auto" mode), a high motion mode (sometimes referred to as an "action" mode), a low motion mode (sometimes referred to as a "scenic" mode), a human subject or face mode, a dark mode, a bright mode, as well as, any other mode commonly implemented within an image capture device. In some instances, each of these various image capture modes is associated with a set of values that a sensor configuration module 19 of image processor 14 uses to configure various image capture properties that affect the quality of the image captured by image sensor 12. The image capture properties of an action mode, for example, may include a relatively short exposure time to effectively capture scenes characterized by quick motion, while the image capture properties associated with a scenic mode may include a relatively long exposure time. In other instances, one or more of these modes, such as the default (also known as normal or auto) mode, may cause sensor configuration module 19 to configure various image capture properties based upon certain visual circumstances within the image scene, such as a measure of the intensity of light received from image sensor 12. For example, sensor configuration module 19 may configure an exposure time, focal point or sensor gain based on the intensity of light received during an image preview. In still other instances, the various image capture modes may cause image processor 14 to perform one or more image processing algorithms to enhance the resulting image captured by image sensor 12. In still another instance, image capture device 10 may support one or more modes that incorporate more than one of the techniques described above in an attempt to capture the highest quality image.

Image processor 14 receives image information for a digital image (or frame), e.g., from a buffer of image sensor 12, and performs the barcode detection techniques described in this disclosure. In particular, a barcode scanner module 18 of image processor 14 determines whether the digital image of the scene of interest includes one or more barcodes. A barcode is a machine-readable representation of information in the form of one or more patterns. Conventional one-dimensional barcodes represent information in the form of a series of parallel, adjacent bars of various widths, spacings and lengths. Barcodes have expanded, however, to represent information in a number of other patterns, such as patterns of dots, concentric circles and the like. These other patterns may include shapes arranged in one-dimensional (1D) or two-dimensional (2D) patterns. Some examples of 1D and 2D barcodes include Universal Product Codes (UPCs), Code 39 barcodes, Code 128 barcodes, PDF417 barcodes, EZcode barcodes, DataMatrix barcodes, QR Code barcodes or barcodes that utilize any other type of symbology.

In some instances, barcode scanner module 18 may detect the barcode while operating in a non-barcode image capture mode. In other words, barcode scanner module 18 may detect the barcode while operating in any of the different image capture modes described above, e.g., the default image capture mode, the face mode, the dark mode, the light mode or any other image capture mode not specifically designed for capturing images of barcodes. In other instances, barcode scanner module 18 may detect the barcode while operating in a barcode image capture mode specifically designed for capturing images of barcodes.

Barcode scanner module 18 detects the barcode within an image in accordance with the techniques described in this disclosure. Barcodes have particular distinguishing characteristics that make them particularly susceptible to detection. As described above, barcodes are formed as patterns of bars, circles, dots or other shapes. The barcode patterns include a number of edges created by the spacing of the bars, circles, dots or other shapes of the patterns. The barcode patterns also include a number of low optical intensity regions due to the black color (or other dark color) of the bars circles, dots or other shapes of the patterns. Not only do barcodes include a number of edges and low intensity pixel values, but the edges and low intensity regions are co-instantaneous, i.e., exist at the same time. As will be described in more detail below, barcode scanner module 18 may identify locations within the digital image that exhibit a high concentration of edges and a high concentration of low intensity values co-instantaneously as candidate locations for being a barcode. Barcode scanner module 18 may then determine whether the candidate locations are actually barcodes by verifying whether the candidate locations have unique barcode features, such as a barcode finder pattern of a particular barcode symbology.

Upon detecting the barcode within the scene of interest, sensor configuration module 19 may configure one or more image capture properties associated with image sensor 12. Sensor configuration module 19 may, for example, configure one or more of an exposure time and a focus control associated with image sensor 12. Image sensor 12 captures an image of the scene of interest that includes the barcode in accordance with the configured image capture properties. In this manner, image capture device 10 may integrate barcode scanning functionality within the default operation of image capture device 10.

Barcode scanner module 18 may perform additional processing of the captured image or at least the region of the captured image that includes the barcode to further enhance the quality of the barcode portion of the image. Barcode scanner module 18 may, for example, process the image or the region of the image that includes the barcode to enhance the contrast of the barcode, sharpen the image of the barcode, filter out noise from the image, correct rotation of the image or perform deconvolution of the barcode image. In some instances, these additional processing techniques may be performed based upon the detection of a barcode within the scene of interest.

Image processor 14 may be realized by one or more microprocessors, digital signal processors (DSPs), application specific integrated circuits (ASICs), field programmable gate arrays (FPGAs), or any other equivalent discrete or integrated logic circuitry, or a combination thereof. In some embodiments, image processor 14 may form part of an encoder-decoder (CODEC) that encodes the image information according to a particular encoding technique or format, such as Motion Pictures Expert Group (MPEG)-2, MPEG-4, International Telecommunication Union (ITU) H.263, ITU H.264, Joint Photographic Experts Group (JPEG), Graphics Interchange Format (GIF), Tagged Image File Format (TIFF) or the like. Image processor 14 may perform additional processing on the image information, such as image cropping, compression, enhancement and the like.

Image processor 14 may store the captured image or at least the region of the captured image that includes the barcode in image storage module 16. Alternatively, image processor 14 may perform additional processing on the image and store either the entire image or the region containing the barcode in processed or encoded formats in image storage module 16. If the image information is accompanied by audio information, the audio information also may be stored in image storage module 16, either independently or in conjunction with video information comprising one or more frames containing the image information. Image storage module 16 may comprise any volatile or non-volatile memory or storage device, such as read-only memory (ROM), electrically erasable programmable read-only memory (EEPROM), or FLASH memory, or such as a magnetic data storage device or optical data storage device.

A number of other elements may also be included in image capture device 10, but are not specifically illustrated in FIG. 1 for simplicity and ease of illustration. For example, image capture device 10 may include additional components for capturing images, such as a lens, a shutter, a flash device, and a viewfinder. The architecture illustrated in FIG. 1 is merely exemplary, as the techniques described in this disclosure may be implemented with a variety of other architectures. Moreover, the features illustrated in FIG. 1 may be realized by any suitable combination of hardware and/or software components.

Figure 2:
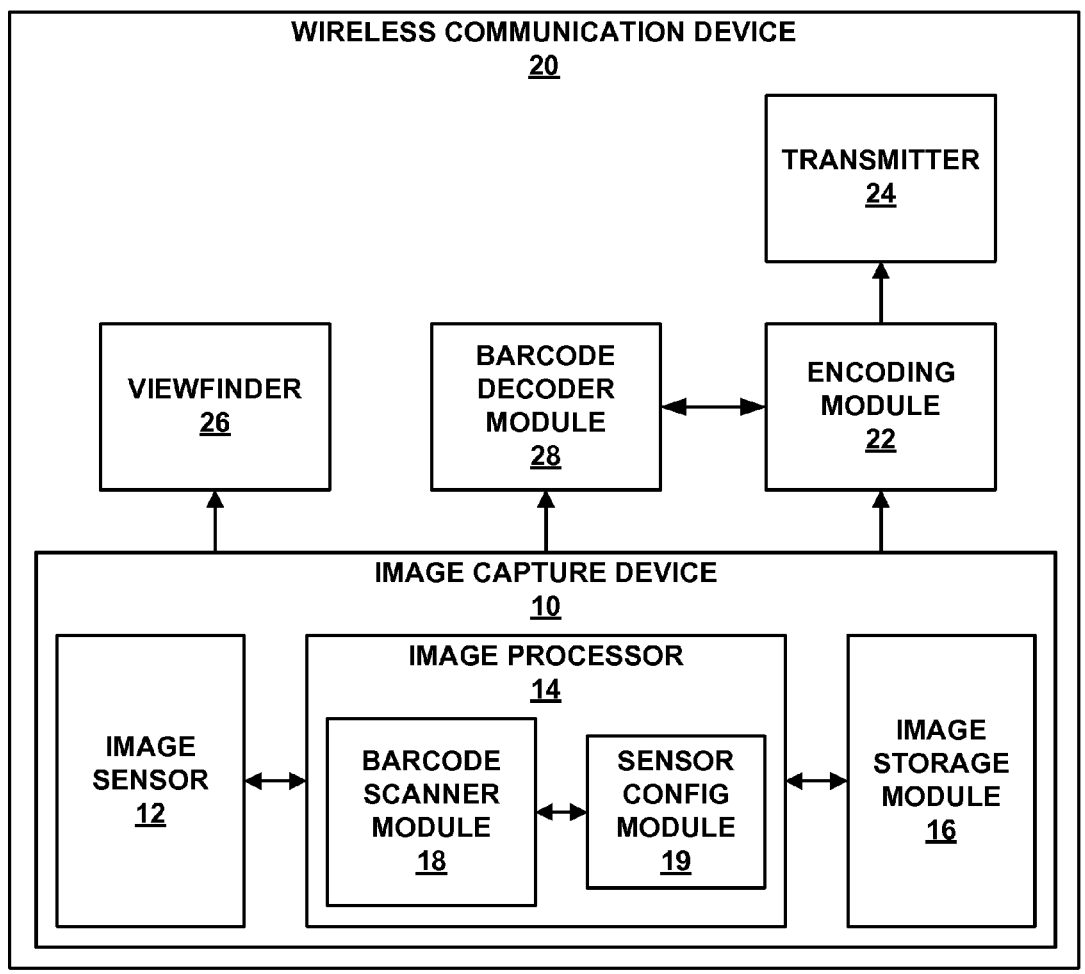
FIG. 2 is a block diagram illustrating an example wireless communication device that includes an image capture device that implements the barcode scanning techniques described in this disclosure.

FIG. 2 is a block diagram illustrating an example wireless communication device 20 that includes an image capture device 10 that implements barcode detection techniques described in this disclosure. In other words, FIG. 2 shows image capture device 10 integrated within wireless communication device 20. Operation of image capture device 10 is described above with respect to FIG. 1 and therefore will not be described in detail here. Wireless communication device 20 may comprise a wireless communication device handset, such as a cellular phone having image capturing capabilities (e.g., a so-called camera phone or video phone), a video recorder, a web cam, a personal digital assistant (PDA), a laptop computer or any other device having image capturing and wireless communication capabilities. Although illustrated in the context of a wireless communication device, the techniques of this disclosure may also be applicable to wired communication devices.

In the example of FIG. 2, wireless communication device 20 includes image capture device 10, an encoding module 22, a transmitter 24, a viewfinder 26 and a barcode decoder module 28. Encoding module 22 may encode the captured image information to compress the image into a particular image compression format for storage and/or transmission. Encoding module 22 may compress the image using any of a number of image compression formats, including JPEG, TIFF, GIF or other image compression format. In the case of video, encoding module 22 may compress the video using any number of video compression formats, such as MPEG, MPEG Advanced Video Coding (AVC) part 10, ITU H.264 and the like.

Wireless communication device 10 may transmit the encoded image to another device via transmitter 24. Transmitter 24 typically provides an interface to a cellular network, such as a code division multiple access (CDMA) network, a wideband code division multiple access (W-CDMA) network, a time division multiple access (TDMA) network, and a global system for mobile communication (GSM) network, or other similar network. Transmitter 24, in addition or as an alternative to the cellular network, may provide an interface to a wireless network as defined by any of the relevant Institute of Electrical and Electronics Engineers (IEEE) 802.11 standards, or any other wired or wireless network.

In some instances, wireless communication device 10 may include a receiver to received encoded data and a decoder to decode the data. As such, wireless communication device may include a separate receiver or transceiver that includes the transmit circuitry of transmitter 24 and receive circuitry.

The decoder may be a separate decoding module or may be integrated with encoding module 24 into a CODEC.

Wireless communication device 20 may present either an image captured by image capture device 10 or a real-time image of the scene of interest to be captured by image capture device 10 (i.e., an image preview) on viewfinder 26. Viewfinder 26 may comprise an electronic viewfinder. Exemplary electronic viewfinders typically include one or more types of displays, such as a liquid crystal display (LCD), an organic light-emitting diode (OLED) display, a plasma display panel (PDP), a light-emitting diode (LED) display (e.g., an active matrix LED display), or any other type of display capable of presenting a captured or real-time image. Viewfinder 26 may also comprise a more conventional optical viewfinder instead of the above described electronic viewfinder. In the case of wireless communication device 20, viewfinder 26 may comprise a general purpose electronic display, where the display also presents information concerning other functions that wireless communication device 20 may perform. For example, if wireless communication device 20 represents the so-called camera phone, viewfinder 26 may also present information concerning the transmission and receipt of cellular phone calls.

Wireless communication device 20 of FIG. 2 also includes barcode decoder module 28. Barcode decoder module 28 may, in some instances, comprise a software application that executes within wireless communication device 20 or, in other instances, a dedicated hardware component, or a combination of both. In either instance, barcode decoder module 28 generally extracts the information (sometimes referred to as a "payload") encoded within a given barcode image by decoding the single- or multi-dimensional pattern presented by the barcode image. After decoding the barcode, barcode decoder module 28 may further cause other modules to execute for the purpose of utilizing the payload or may itself utilize the payload.

In particular, barcode decoder module 28 may decode the pattern included within a barcode image received by image capture device 10 to extract the payload. Barcode decoder module 28 may, for example, access a symbol library to decode the barcodes. The symbol library may, for example, include the encoding of the single digits and/or characters of the payload as well as other information useful in decoding the barcode. In some instances, as in the case of universal product codes (UPCs), the payload may identify the item to which it is attached. Additionally, the payload may include additional information associated with the item to which the barcode is attached. For example, the payload may include additional item information not displayed on the item itself, information about related items, promotional coupons for the item or related items, relevant internet links for the item or related items, or any other associated information.

In some instances, the information may be contained directly within the payload of the barcode. In other instances, the information contained within the payload may be used to retrieve the relevant information, e.g., from a database that associates the payload with the additional information related to the item. In the case in which the payload includes relevant internet links, for example, the payload may comprise a Hypertext Transfer Protocol (HTTP) address. Barcode decoder module 28 may invoke a web browser to access the HTTP address specified by the payload and load the HTTP address on viewfinder 26. In this manner, a user of wireless communication device 20 may view the additional information associated with the item to which the captured barcode attaches via the Internet. Additionally, the user may utilize the payload of the barcode to obtain information for applications not related to the item itself For example, the user may scan the barcode located on a street sign and then access a mapping program to get directions from the item (e.g., street sign) that includes the barcode to a location to which the user desires to go.

Although described as including only image capture device 10, encoding module 22, transmitter 24, a viewfinder 26, and a barcode decoder module 28, wireless communication device 20 may include other modules, such as a user interface (e.g., a keypad) for interfacing with a user, one or more processors for performing additional operations, and various ports and receptacles for accepting removable memory, headphones, power supplies, and any other such peripherals. Wireless communication device 20 may additionally include other components for transmission and receipt of information such as a modem, frequency converter, filter and amplifier circuitry.

Figure 3:
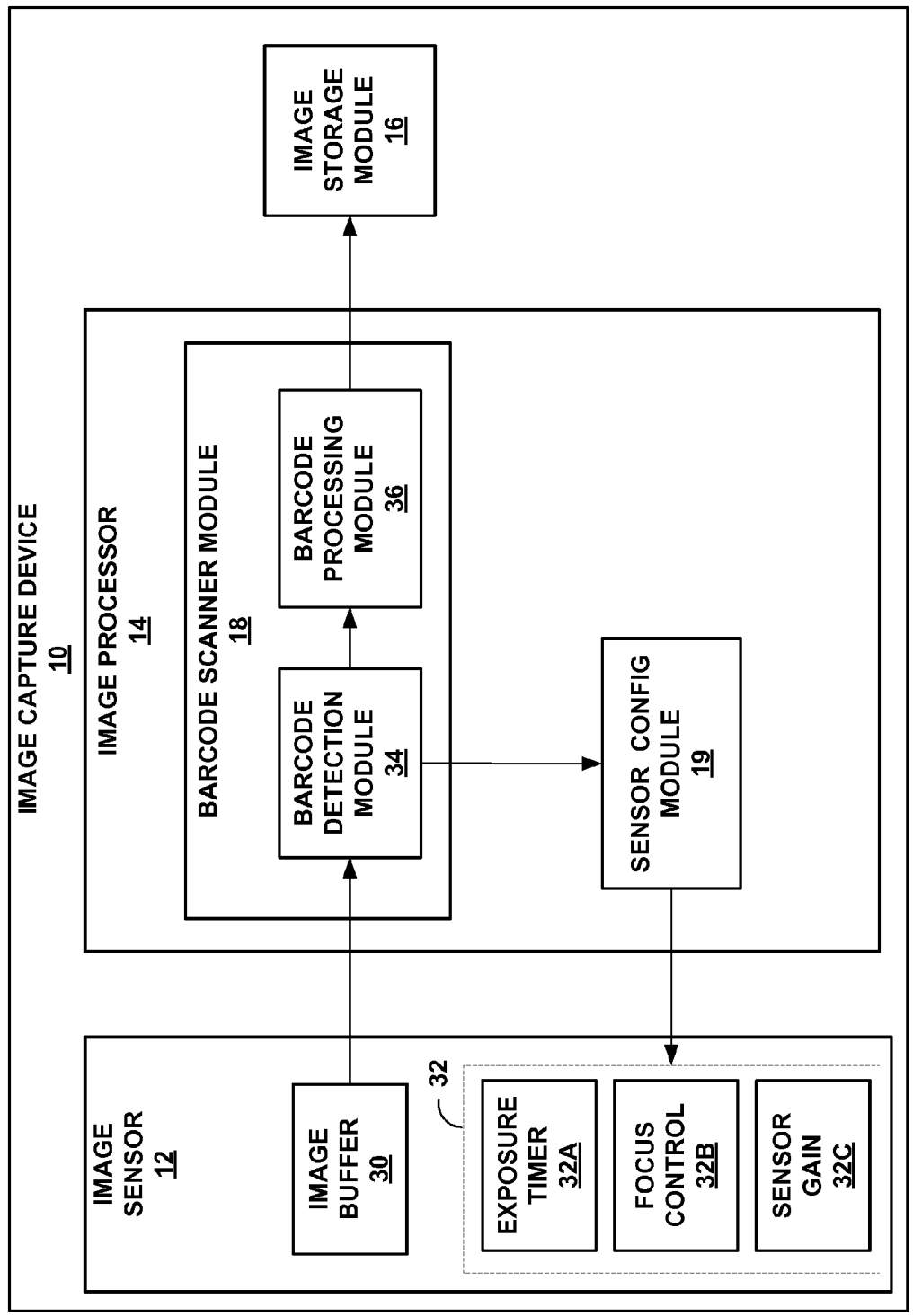
FIG. 3 is a block diagram illustrating image capture device of FIGS. 1 and 2 in further detail.

FIG. 3 is a block diagram illustrating image capture device 10 of FIGS. 1 and 2 in further detail. As illustrated in FIG. 3, image sensor 12 may include an image buffer 30 which may store image information pertaining to a scene of interest. Image sensor 12 may, for example, store the image information in image buffer 30 during an image preview. More specifically, image sensor 12 may store the image information in image buffer 30 while the user is pointing image capture device 10 at the scene of interest, but before the user actuates a button to capture the image. In this manner, image buffer 30 may be viewed as storing a real-time image of the scene of interest to be captured by image capture device 10. Buffer 30 may comprise any volatile or non-volatile memory or storage device, such as read-only memory (ROM), electrically erasable programmable read-only memory (EEPROM), or FLASH memory, or such as a magnetic data storage device or optical data storage device. Although shown as including one image buffer 30, image sensor 12 may include no image buffers or multiple image buffers.

Image sensor 12 also generally includes one or more image capture control properties 32 for configuring image sensor 12. In the example illustrated in FIG. 3, image sensor 12 includes an exposure timer 32A, a focus control 32B and a sensor gain 32C. Exposure timer 32A represents a configurable timer for setting a time during which image sensor 12 is exposed to the scene of interest. Typically, image processor 14 configures exposure timer 32A based on a set of conventional exposure formulas or an exposure table associated with the image capture device. Focus control 32B exists for those image capture devices 10 capable of focusing on the scene of interest automatically. Focus control 32B represents a configurable control value for setting a distance on which image sensor 12 should focus and/or setting a lens position that produces an optimum focus value (e.g., a sharpness value determined by optimum contrast). Typically, image processor 14 configures focus control 32B to focus a lens on a particular region of the scene of interest, e.g., the center of the scene of interest. Sensor gain 32C represents a configurable sensor gain control value that determines the amplifier gain of the image sensor elements of image sensor 12. Like exposure times 32A, image processor 14 may configure sensor gain 32C based on a set of conventional gain formulas or a gain table associated with the image capture device. In some instances, adjustments of one or more of exposure timer 32A, focus control 32B and sensor gain 32C sensor gain 32C may be inter-related. While shown in FIG. 3 as residing within image sensor 12, buffer 30 and image capture control properties 32 may reside external to image sensor 12, such as within other modules of image capture device 10 including image processor 14, image storage module 16, or barcode scanner module 18.

Barcode scanner module 18 includes a barcode detection module 34 and a barcode processing module 36. Depiction of different features as units or modules is intended to highlight different functional aspects of barcode scanner module 18, and does not necessarily imply that such units or modules must be realized by separate hardware, software and/or firmware components. Rather, functionality associated with one or more units or modules may be integrated within separate or common hardware, software components and/or firmware components.

As described above, image sensor 12 captures a digital image and stores the digital image in buffer 30. Barcode scanner module 18 receives the digital image from buffer 30 and employs barcode detection module 34 to automatically detect a barcode within the digital image. As described above, barcode detection module 34 may automatically detect the barcode within the digital image while image processor 14 operates according to a non-barcode image capture mode, such as a default image capture mode, a high motion mode, a low motion mode, a human subject or face mode, a dark mode, a bright mode or any other mode not specifically designated to capturing images of barcodes. Alternatively, the barcode detection techniques may be utilized in a barcode image capture mode designated specifically for capturing images of barcodes.

Barcode detection module 34 may perform barcode detection using a morphological operation based detection technique. As described above, the morphological operation technique is based on the fact that barcodes have particular distinguishing characteristics, i.e., they have regions of a high concentration of edges and regions of a high concentration of low intensity values that are spatially co-instantaneous. As will be described in detail below, barcode detection module 34 may detect barcodes by identifying regions that include edges and low optical intensity co-instantaneously using morphological operations as candidates for being a barcode, and verifying whether the candidate regions have unique barcode features.

Barcode detection module 34 may obtain luminance values of the captured digital image from image buffer 30. When the captured image information is in the Y-Cb-Cr (luminance, blue chrominance, red chrominance) domain, for example, barcode detection module 34 may retrieve the Y-channel values for use in barcode detection. In instances in which the image information is in another color domain, e.g., the RGB (red, green, blue) domain, barcode detection module 34 may convert the image to grayscale. In some instances, the luminance information may be sharpened slightly, e.g., using a sharpening mask, to assist in barcode detection.

Barcode detection module 34 processes the image to identify edges within the digital image. Edges are locations of the digital image that exhibit high contrast transitions in luminance intensity. For example, the edge may define a transition from a low intensity to a high intensity, i.e., from light to dark, or from a high intensity to a low intensity, i.e., from dark to light. Due to the nature of barcodes, i.e., black and white (or other dark and light) patterns, barcodes generate prominent, easily detectable edges. To identify the edges within the digital image, barcode detection module 34 may analyze the image to detect locations in which luminance values exhibit significant change. Barcode detection module 34 may identify the edges within the image using conventional edge detection techniques. For example, barcode detection module 34 may apply a kernel matrix (e.g., a matrix of weights or multiplication factors) to the digital image to detect the edges. The kernel matrix is typically much smaller than the actual image to which it is applied. A three pixel by three pixel (3×3) kernel matrix will be described for purposes of example. However, barcode detection module 34 may use a kernel matrix of other dimensions.

In particular, barcode detection module 34 centers the 3×3 kernel matrix on each pixel of the image in turn, and multiplies the pixel values of the 3×3 region around the center pixel by the corresponding weights of the kernel matrix to generate weighted pixel values. Barcode detection module 34 sums the weighted pixel values to obtain a first order derivative of the center pixel. The image processor compares the first order derivative of the center pixel to a transition threshold value and detects an edge when the first order derivative is greater than or equal to the transition threshold value. If the first order derivative is greater than or equal to the transition threshold value, the pixel is determined to be located on an edge. In one aspect, barcode detection module 34 may set pixels determined to be located at an edge to an intensity value associated with white or black, and set pixels determined to not be located at an edge to the opposite intensity value, e.g., black or white. Thus, the result of the edge detection may be an edge map that is a binary image that represents the original image with all detail removed except for the identified edges. The binary image may be a black and white image in which the edges are white and the rest of the image is black, or vice versa, i.e., edges are black and the rest of the image is white. Although barcode detection module 34 is described as detecting the edges using the first derivative of the digital image, other edge detection techniques may be used to detect edges within the image, such as using a second order derivative of the digital image.

Barcode detection module 34 also processes the image to identify regions of the image with low intensity (referred to herein as "low intensity regions"). The low intensity regions correspond with the dark portions of the image. Barcode detection module 34 may identify the low intensity regions of the image via thresholding. In particular, barcode detection module 34 may identify the low intensity regions of the image by comparing each of the pixel intensity values with an intensity threshold value and filter out any pixel values that are greater than or equal to the intensity threshold value. Thus, the result of the low intensity detection may be a low intensity map that is a binary image that represents the original image with the high intensity regions removed. In one example, barcode detection module 34 may set pixel intensity values that are less than or equal to the intensity threshold value to white and set pixel intensity values that are greater than or equal to the intensity threshold value to black. In this case, the low intensity regions of the image are represented as white regions and the non-low intensity regions of the image are represented as black. Alternatively, the low intensity regions may be represented as black regions and the other regions represented as white regions. In some instances, barcode detection module 34 may process the digital image to identify the edges and low intensity regions of the image in parallel.

Barcode detection module 34 performs one or more morphological operations on the edge map to identify locations within the image that exhibit a high concentration of edges. Likewise, barcode detection module 34 performs one or more morphological operations on the low intensity map to identify locations within the image that exhibit a high concentration of low intensity values. The morphological operations may be performed on the edge map and the low intensity map concurrently (i.e., in parallel) or consecutively. The morphological operations may include one or more of a dilation operation, an erosion operation, an opening operation, a closing operation or the like. In one example, barcode detection module 34 may perform dilation on the edge map and the low intensity map. The dilation generally fills in holes and broken areas, and connects areas that are separated by spaces that are smaller than a size of a structuring element used for the dilation.

For binary images, the structuring element, e.g., a 3×3 structuring element, is centered on each of the pixels. If any of the pixels within the structuring element are white, the pixel value that the structuring element is centered on is set to white. A similar approach may be preformed for grayscale images. In grayscale images, for example, each of the pixel values may be recomputed using the structuring element by setting a pixel value equal to the maximum pixel value of the pixel values within the structuring element. In this manner, bright regions surrounded by dark regions grow in size, and dark regions surrounded by bright regions shrink in size. Small dark spots in images will disappear as they are "filled in" to the surrounding intensity value. The effect is most marked at places in the digital image where the intensity changes rapidly, e.g., in regions in which a barcode located.

Barcode detection module 34 combines the dilated edge map and the dilated low intensity map. Barcode detection module 34 may, for example, perform an "AND" operation to combine the dilated edge map and the dilated low intensity map. The combined image represents the portions of the image that are identified as an edge and a low intensity region. In other words, the combined image represents the portions of the image at which edges and low intensity regions are spatially co-instantaneous.

Barcode detection module 34 again performs one or more morphological operations on the combined image. For example, barcode detection module 34 may perform another dilation operation on the combined image to fill in holes and broken areas, and connect areas that are separated by spaces that are smaller than the size of a structuring element used for the dilation. Barcode detection module 34 may also perform a flood fill operation to the combined, dilated image to further fill any remaining holes within the regions of the combined, dilated image. The flood fill operation fills holes inside the object. In some instances, barcode detection module 34 may perform a close operation instead of a flood fill operation. The close operation closes small holes that within the size of a filling element, whereas the flood fill operation closes all holes within the object regardless of the size of the hole. In this manner, the one or more morphological operations performed on the combined image make the regions with overlapping edges and low intensity portions a solid, or nearly solid, white region.

Barcode detection module 34 analyzes the locations that remain in the combined image after the one or more morphological operations to identify locations of the digital image that may potentially be barcodes. In other words, barcode detection module 34 determines whether the location is a candidate for being a barcode. Barcode detection module 34 may, for example, compare each of the locations remaining in the combined image to one or more barcode criteria to determine whether the location is a candidate for being a barcode. Barcode detection module 34 may, for example, compare a size of the location to barcode size criteria to determine whether the location is too small or too big to be a barcode. If the size of the location is smaller than a threshold barcode detection module 34 may determine that the location is not a barcode. Locations that are too small may, even if the location was detected as a barcode, be incapable of being captured by the lens system of image capture device 10 in enough detail to resolve the barcode. As another example, barcode detection module 34 may compare a shape of the location to a barcode shape criteria to eliminate locations that are not substantially similar to the shape of a barcode, e.g., rectangular or square. In yet another example, barcode detection module 34 may compare a filling factor of the location with a barcode filling factor criteria. In particular, a square or rectangle may be placed around the location to determine how many pixels are not white relative to the surrounding rectangular area. If the percentage of pixels that are not white relative to the surrounding rectangular area exceeds a threshold percentage, the location may be eliminated from candidate locations.

Barcode detection module 34 may then determine whether the remaining locations are actually barcodes by verifying whether the remaining digital image at the locations have unique barcode features. In the case of some 2D barcodes, for example, barcode detection module 34 may analyze the locations of the image identified by barcode detection module 34 as candidates for being a barcode to determine whether the identified location includes a barcode finder pattern. In the case of a 2D Data Matrix barcode, barcode detection module 34 may look for unique perimeter pattern within the location, e.g., two perpendicular lines made up of alternating black and white square modules. In the case of a 2D QR barcode, barcode detection module 34 may look for a finder pattern of nested alternating dark and light squares at three corners of the identified location. Barcode detection module 34 may, however, analyze the identified locations for other unique barcode finder patterns or other unique features associated with other barcode symbologies. Moreover, barcode detection module 34 may analyze images other than the original image, such as the grayscale version of the digital image, the generated edge map or the generated low intensity map for the unique barcode features or patterns.

The barcode detection techniques described above may provide several advantages. For example, the barcode detection techniques may be independent of barcode size, location and orientation within the image. Moreover, the use of morphological operations in the barcode detection techniques described in this disclosure result in faster and more computationally efficient barcode detection. Moreover, the barcode detection techniques may additionally be of a lower computational complexity.

If barcode detection module 34 does not detect a barcode within the image, image processor 14 may control image sensor 12 to capture the image without further performing the barcode scanning techniques described in this disclosure. That is, image capture device 10 may capture the image according to conventional image capture techniques, e.g., based on the amount of light within the scene of interest or with the focal point in the center of the scene of interest. In fact, a user of image capture device 10 may not even know that image capture device 10 attempted to detect a barcode within the scene of interest. Instead, barcode detection may be performed in the background without engaging the user.

Upon detecting a barcode within the preview image, barcode scanner module 18 may interact with a viewfinder, such as viewfinder 26 of FIG. 2, to indicate the detection of the barcode within the image. In some instances, barcode scanner module 18 may further indicate the location of the barcode within the image to the user, e.g., via placing a box around the detected barcode. Barcode scanner module 18 may also prompt a user of image capture device 10 to determine whether the user desires to capture the barcode and perform further barcode decoding operations or simply capture the general scene of interest in accordance with conventional image capture techniques. In this manner, the user has the option to capture the scene of interest in a conventional manner when there is a barcode within the scene of interest, but the user's intent was not to scan the barcode. In other aspects, however, image capture device 10 may not prompt the user, but instead simply capture and process the image in accordance with the techniques herein, i.e., as if the purpose was to scan the barcode within the scene of interest. Any of a variety of techniques may be used to determine whether to capture and process the image as if the purpose was to scan the barcode within the scene of interest. For example, image capture device 10 may capture and process the image as if the purpose was to scan the barcode within the scene of interest when the barcode is greater than or equal to a threshold size, e.g., the barcode takes up at least one-quarter of the image.

If the user, in response to the barcode prompt, responds that further barcode decoding operations should be performed or no such prompt is provided, sensor configuration module 19 may configure image capture properties 32 of image sensor 12 such that image sensor 12 may capture the barcode with an improved quality. In particular, sensor configuration module 19 configures image capture properties 32 of image sensor 12 to improve the quality of the region or regions of the scene of interest that includes the barcode. For example, sensor configuration module 19 may configure exposure timer 32A and/or focus control 32B such that image sensor 12 will capture, in high quality, the region of scene of interest with the barcode. That is, given the location of the barcode within the image, sensor configuration module 19 may compute the optimum exposure time for that region of the scene of interest containing the barcode and, using conventional exposure time algorithms, configure exposure timer 32A. For example, sensor configuration module 19 may analyze light intensity in the region of the scene of interest that contains the barcode and set an exposure time based on the light intensity of that particular region of scene of interest.

Additionally, or alternatively, given the location of the barcode within the scene of interest, sensor configuration module 19 may compute the optimum focus control for that region of scene of interest containing the barcode and, using conventional focus control algorithms, configure focus control 32B to use the location of the barcode as the focal point of image sensor 12. Once image capture properties 32 are configured, image processor 14 may cause image sensor 12 to capture an image in accordance with image capture properties 32. Although in the example instances described above, image capture properties 32 configured by sensor configuration module 19 include exposure time and focus control, other image capture properties may be configured instead of, or in addition to, exposure time and focus control. For example, sensor configuration module 19 may configure a sensor gain, e.g., an amplifier gain of image sensor 12.

In some instances, image capture device 10 may be operating in a barcode image capture mode. In this case, image capture properties 32 may be configured prior to detection of the barcode within the image. Barcode detection module 34 may detect the barcode within the image for purposes of processing of the barcode instead of detecting the barcode within the image for purposes of configuring image capture properties 32 of image sensor 12.

After capturing an image of scene of interest according to image capture properties 32, barcode processing module 36 may process the captured image. Barcode processing module 36 may, for example, crop the image such that only the region of the image that includes the barcode remains. Barcode processing module 36 may crop the captured image to include only the barcode or barcodes within the image, e.g., using the barcode location information generated by barcode detection module 34 during detection of the barcode. Alternatively, barcode detection module 34 may perform barcode detection at this point in the barcode capture operation to identify the location of the barcode within the digital image. In instances in which there are more than one barcode within the image, barcode processing module 36 may extract each of the barcodes from the image separately.

Alternatively, or additionally, barcode processing module 36 may further process the captured image to remove distortion to generate a clean, uniform barcode for use by subsequent barcode decoder modules, e.g., barcode decoder module 28 of FIG. 2. In some instances, barcode processing module 36 may correct distortion only in the region of the image that includes the barcode. Alternatively, barcode processing module 36 may correct distortion of the entire image. Barcode processing module 36 may perform distortion correction techniques to correct for any of a variety of distortion problems. For example, barcode processing module 36 may rotate the image to orient the barcode within the image such that the barcode can be viewed correctly.

As another example, barcode processing module 36 may process the image to correct for distortion caused by light and shadows that may obscure the single- or multi-dimensional pattern of the barcode. Distortion correction module 38 may additionally process the image to correct for problems related to perspective. That is, the barcode may be skewed due to the perspective at which the user captured the image of the barcode. Barcode processing module 36 may therefore process the image to correct a skewed barcode. Barcode processing module 36 may also correct for warping of the barcodes that occurs when the barcode is placed upon non-flat items. For example, barcode processing module 36 may correct for warping of the barcode due to the barcode being placed upon an aluminum can or glass bottle.

Image processor 14 may store the captured barcode image within image storage module 16. Image capture device 10 may provide the captured image to barcode decoder module 28 (FIG. 2) for decoding in order to extract the payload of the barcode. In this manner, barcode scanner module 18 may provide a consistent front-end interface by which barcodes can be captured with an improved image quality that may support more reliable and accurate barcode decoding. Automatic detection of barcodes while the image capture device executes in a non-barcode image capture mode may be particularly effective in eliminating or reducing extraneous user interaction, such as selecting a special barcode camera mode or executing a special barcode capture application. Moreover, configuring image capture properties of image sensor 12 instead of performing image enhancement techniques at the back-end may provide higher quality images of the barcodes.

The functionality as described in this disclosure and ascribed to barcode scanner module 18 and sensor configuration module 19 may be performed by one or more programmable processors that execute instructions stored on a computer-readable medium, where the instructions and/or code cause the processor to perform barcode scanning as described in this disclosure. In some cases, the computer-readable medium may form part of a computer program product, which may be sold to manufacturers and/or used in a device. Alternatively, the techniques described in this disclosure and ascribed to barcode scanner module 18 and sensor configuration module 19 may be implemented generally in hardware and particularly within an integrated circuit device. The integrated circuit device comprises one or more processors configured to perform the functionality described in this disclosure.

Figure 4:
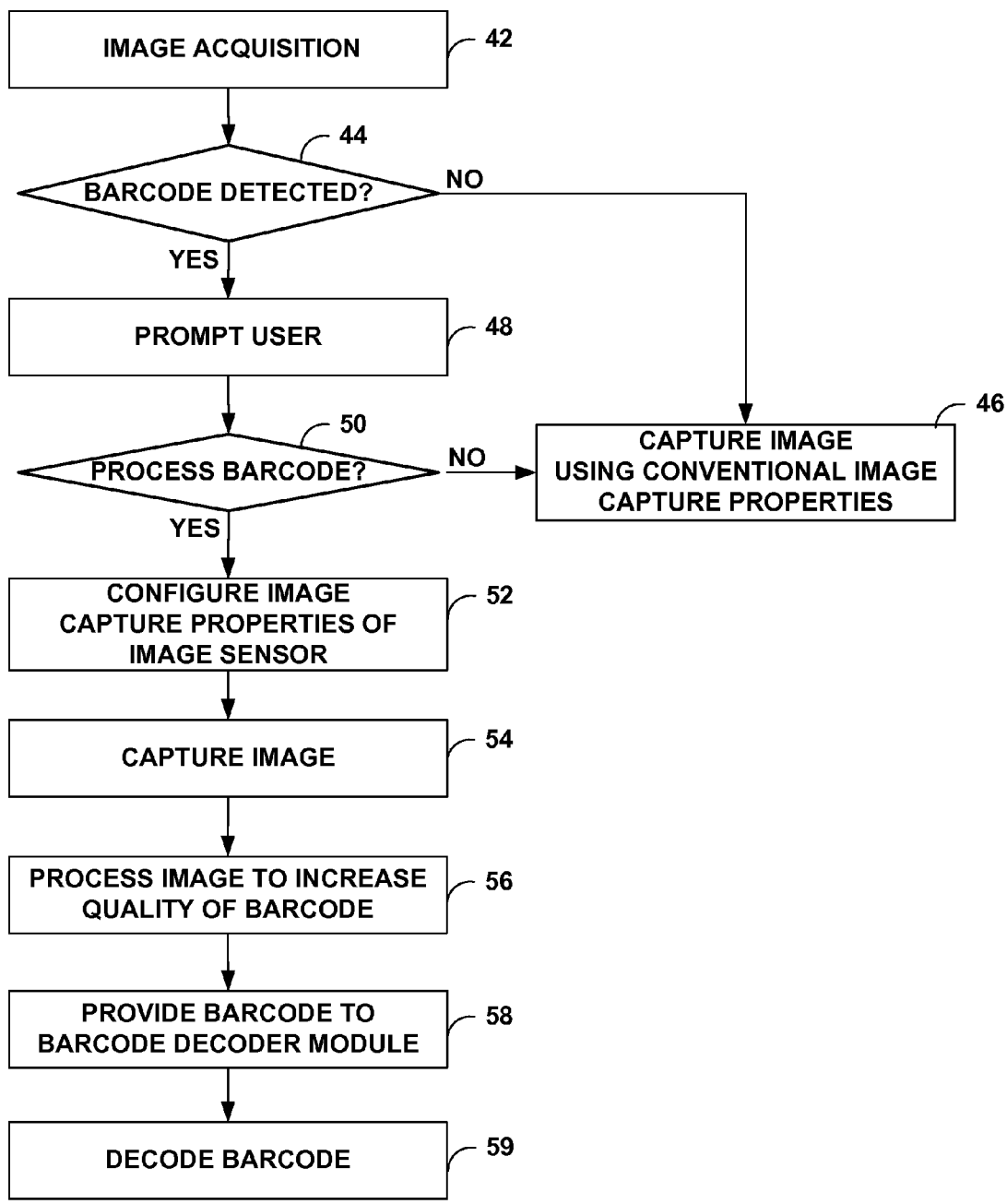
FIG. 4 is a flow diagram illustrating example operation of an image capture device performing the barcode scanning techniques described in this disclosure.

FIG. 4 is a flow diagram illustrating example operation of an image capture device, such as image capture device 10 of FIG. 3, performing barcode scanning. Initially, a user initiates image capture and image sensor 12 begins image acquisition (42). That is, image sensor 12 captures and stores image information to image buffer 30. In some instances, the image sensor 12 captures and stores the image information to image buffer 30 during an image preview, i.e., while the user is pointing image capture device 10 at the scene of interest, but before the user actuates a button to capture the image. Image acquisition may begin in any of the image capture modes, including the barcode image capture mode.

Barcode detection module 34 receives the digital image and detects whether the scene of interest includes a barcode (44). Barcode detection module 34 may identify locations of the image that exhibit a high concentration of edges and a high concentration of pixels with low optical intensity co-instantaneously. Barcode detection module 34 may then determine whether the identified locations are actually barcodes by verifying whether the locations have unique barcode features, such as barcode finder patterns or other features that uniquely identify a particular barcode symbology. The barcode detection technique is described in more detail with respect to FIG. 5.

If barcode detection module 34 does not detect a barcode within the scene of interest, image processor 14 may control image sensor 12 to capture the image according to image capture properties determined based on some other criteria (46). For example, image processor 14 may control image sensor 12 to capture the image according to image capture properties determined based on an amount of light in the scene of interest, amount of motion within the scene of interest, or other characteristic of the scene when barcode detection module 34 does not detect a barcode within the scene of interest.

If a barcode is detected within the scene of interest, barcode scanner module 18 may prompt the user to determine whether the user desires to capture the barcode and perform further barcode decoding operations or simply capture the general scene of interest in accordance with conventional image capture techniques (48, 50). In this manner, the user has the option to capture the scene of interest in a conventional manner when there is a barcode within the scene of interest, but the user's intent was not to scan the barcode.

If the user responds to the prompt by signaling an intent to forego furthering processing of the detected barcode, image capture device 10 captures the image according to conventional image capture properties (46). In some instances, image capture device 10 may not prompt the user, but instead may simply capture and process the image in accordance with the techniques herein, i.e., as if the purpose was to scan the barcode within the scene of interest. In that case, it is assumed that barcode capture is desired, and blocks 48 and 50 may be skipped.

If the user signals an intent to continue processing the detected barcode or image capture device 10 does not include such a prompt feature, sensor configuration module 19 configures one or more image capture properties of image sensor 12 (52). Sensor configuration module 19 may, for example, configure an exposure time 32A, a focus control 32B or a sensor gain 32C in the manner described above such that the region of the scene of interest that includes a barcode is captured with an improved quality.

Image processor 14 causes image sensor 12 to capture an image of the scene of interest in accordance with the configured image captured properties (54). Barcode processing module 36 may process the captured image to increase the quality of the region of the image that includes the barcode (56). Barcode processing module 36 may, for example, crop the image such that only the region of the image that includes the barcode remains. Alternatively, or additionally, barcode processing module 36 may further process the captured image to remove distortion to generate a clean, uniform barcode for use by subsequent barcode decoder modules. Barcode processing module 36 may perform distortion correction techniques to correct for any of a variety of distortion problems, including distortion related to rotation, lighting, perspective or skew, and warping.

After capturing and processing the barcode, barcode scanner module 18 may provide the barcode to a barcode decoder module for decoding to obtain the payload (58). The barcode decoder module decodes the barcode to obtain the payload (59). It should be noted that this process may occur without formally storing the barcode to image storage module 16. That is, the above process may occur in real-time or near real-time, and the barcode may be presented to a barcode decoder module without ever being stored to image storage module 16, thereby saving space within image storage module 16. In some instances, however, the barcode may be stored prior to providing the barcode to the barcode decoder module.

Figure 5:
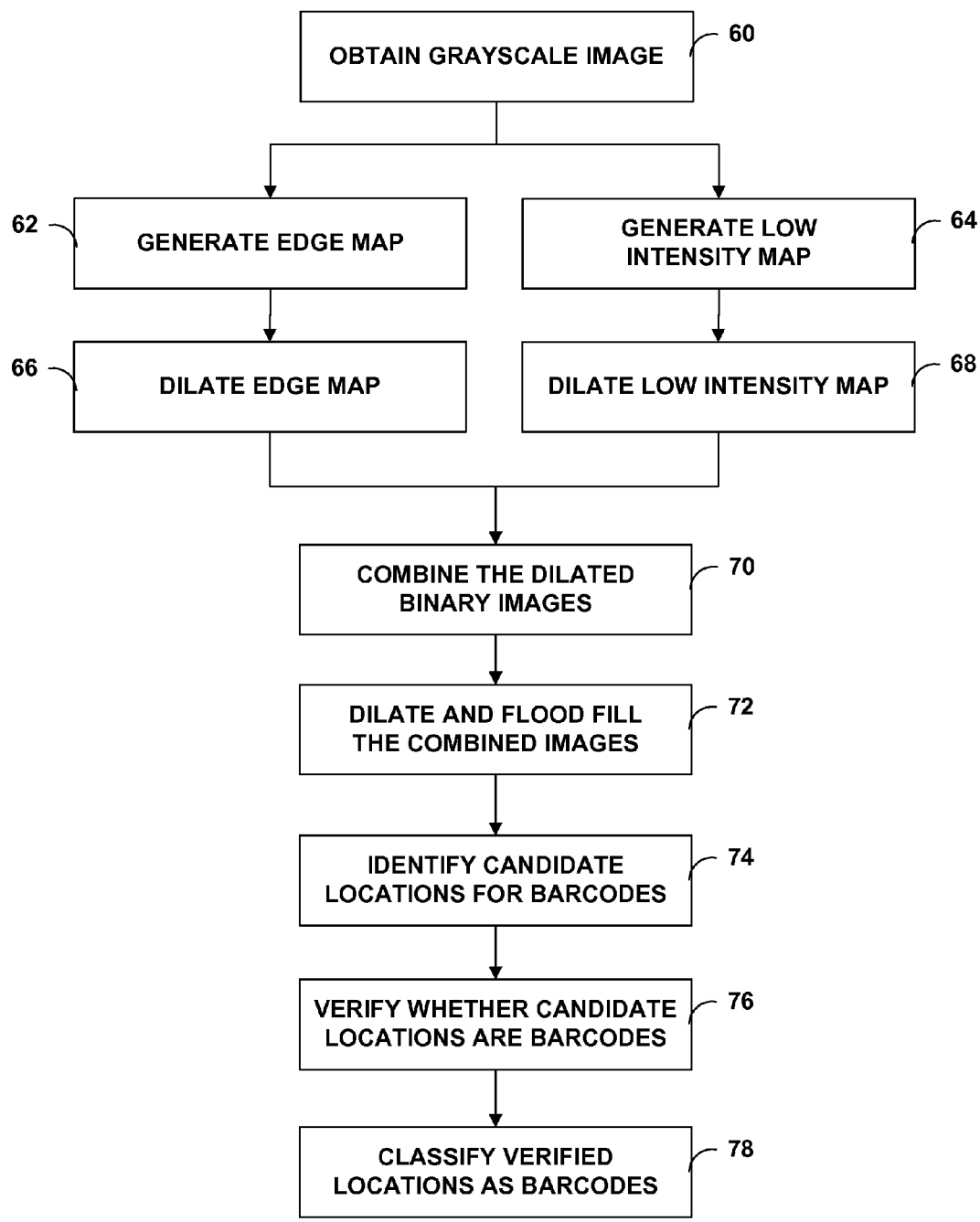
FIG. 5 is a flow diagram illustrating example operation of a barcode detection module detecting a barcode within a scene of interest.

FIG. 5 is a flow diagram illustrating example operation of an image capture device, such as image capture device 10 of FIG. 3, performing barcode detection in accordance with the techniques described in this disclosure. Initially, barcode detection module 34 may obtain a grayscale version of the image (60). When the captured image information is in the Y-Cb-Cr domain, for example, barcode detection module 34 may obtain the Y-channel values. In instances in which the image information is in another color domain, e.g., the R-G-B domain, barcode detection module 34 may convert the image to grayscale.

Barcode detection module 34 generates an edge map that is a representation of the image with all detail removed except for the identified edges within the image (62). As described in detail above, barcode detection module 34 may generate the edge map by applying an edge detection kernel to the image on a per-pixel basis. In one example, the edge map may be a binary image, i.e., black and white image, with the edges in white and the rest of the image in black.

Barcode detection module 34 also generates a low intensity map that is a representation of the image with the non-low intensity regions removed (64). Barcode detection module 34 may identify the low intensity regions of the image by comparing each of the pixel intensity values with an intensity threshold value and filter out any pixel values that are greater than or equal to the intensity threshold value. In one example, the low intensity map may be a binary image with the low intensity regions in white and the rest of the image in black. Barcode detection module 34 may process the digital image to identify the edges and low intensity regions in parallel. Alternatively, the operation may be performed consecutively.

In the example of FIG. 5, barcode detection module 34 performs dilation on the edge map (66). Barcode detection module 34 also performs dilation on the low intensity map (68). As described above, the dilation generally fills in holes and broken areas, and connects areas that are separated by spaces that are smaller than a size of a structuring element used for the dilation. The dilation results in the bright regions of the image growing in size and dark regions shrinking in size.

Barcode detection module 34 combines the dilated edge map and the dilated low intensity map (70). Barcode detection module 34 may, for example, perform an "AND" operation to combine the dilated edge map and the dilated low intensity map. In other words, the combined image represents the portions of the image at which edges and low intensity regions are spatially co-instantaneous. Barcode detection module 34 performs dilation on the combined image and flood fills any holes in the combined, dilated image (72).

Barcode detection module 34 analyzes the combined image after dilation and flood-filling to identify locations that are candidates for being barcodes (74). Barcode detection module 34 may compare each of the locations of the combined image to one or more barcode criteria to determine whether the location is a candidate for being a barcode. Barcode detection module 34 may, for example, analyze a size of the locations, shape of the locations, fill factor of the locations, or other similar characteristic, or combination of characteristics of the locations in the combined image to identify the locations that are candidates for being a barcode.

Barcode detection module 34 may verify whether the candidate locations are actually barcodes (76). For example, barcode detection module 34 may analyze the locations of the original image identified as candidate locations for unique barcode finder patterns, such as two perpendicular lines of alternating black and white squares in the case of a 2D Data Matrix barcode or a nested pattern of alternating black and white squares in three corners of the location in the case of a 2D QR barcode. In other aspects, barcode detection module 34 may analyze images other than the original image, such as the grayscale version of the digital image, the generated edge map or the generated low intensity map. Barcode detection module 34 classifies verified locations as barcodes (78). In other words, barcode detection module 34 detects a barcode when the candidate location includes a unique barcode feature.

Figure 6A:
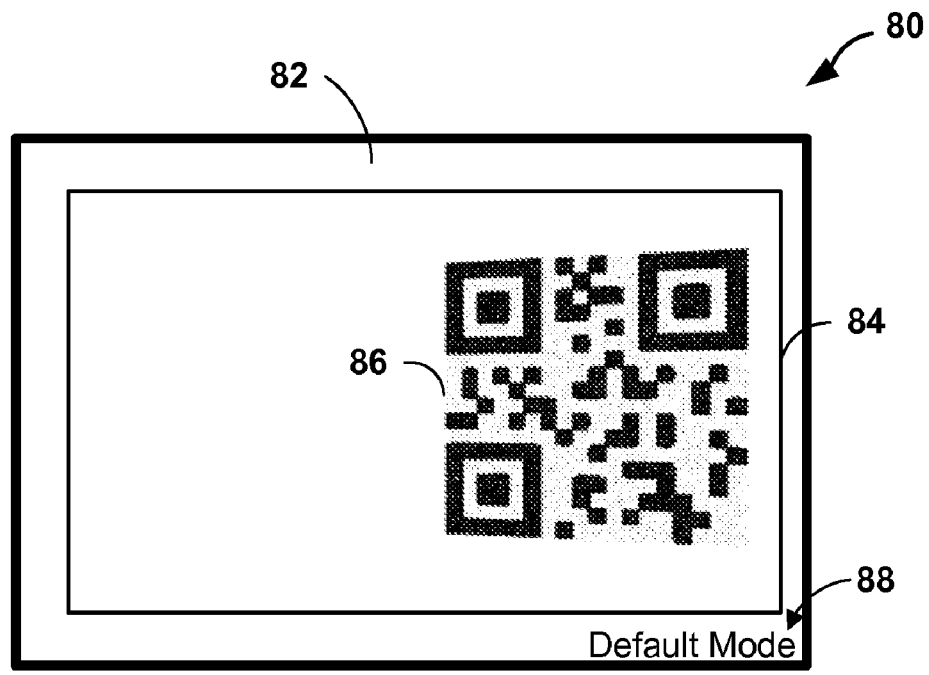
FIGS. 6A-6D are illustrations of an exemplary viewfinder in presenting an image in accordance with the barcode scanning techniques described in this disclosure.

FIGS. 6A-6D are illustrations of an exemplary viewfinder 80 presenting an image in accordance with the barcode scanning techniques described in this disclosure. Viewfinder 80 may be substantially similar to viewfinder 26 of FIG. 2. As shown in FIG. 6A, viewfinder 80 presents an image 82 typically in real time of a scene of interest. The scene of interest may include a number of objects either in the background or foreground, but is illustrated as a blank scene for ease of illustration. Image 82 includes an item 84 to which a barcode 86 attaches, or at least appears to attach. Item 84 may include any of a number of items, such as boxes or other product packaging, cans, magazines or other products, street signs, or any other type of item. Viewfinder 80 may overlay upon image 82 a mode indicator 88 that shows the mode in which the image capture device, such as image capture device 10 of FIG. 3, is operating. Presently, mode indicator 88 shows that image capture device 10 is operating in the "Default Mode." Although illustrated and described in FIGS. 6A-6D as operating in the default image capture mode, the barcode scanning techniques of this disclosure may be used to detect barcodes in any non-barcode image capture mode, such as a high motion mode (also referred to as an action mode), a low motion (also referred to as a scenic or landscape mode), a human subject or face mode, a dark mode, a bright mode or any other mode not specifically designated to capturing images of barcodes. Additionally, the techniques of this disclosure may be used to detect barcodes in a barcode image capture mode specifically designed to capture images of barcodes as well.

Figure 6B:
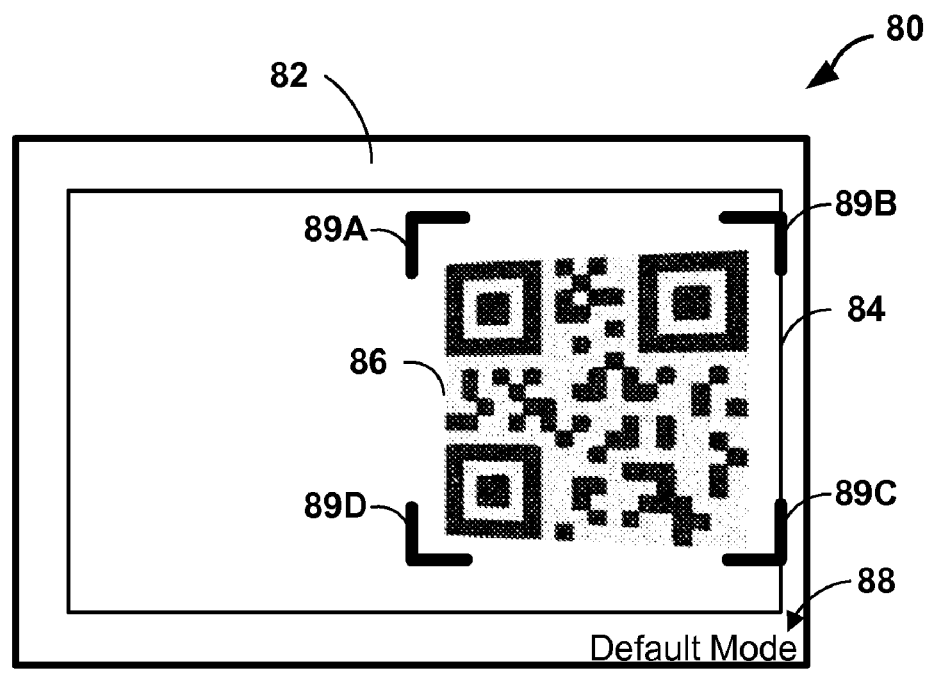

While operating in the default mode, barcode scanner module 18 performs the barcode scanning techniques described in this disclosure. Barcode detection module 34, for example, detect barcode 86 within image 82 in the manner described above, e.g., with reference to FIG. 5. FIG. 6B shows viewfinder 80 after barcode scanner module 18 updates viewfinder 80 to reflect the detection and location of barcode 86. In particular, viewfinder 80 now includes barcode signaling marks 89A-89D ("marks 89"). Marks 89 indicate the location of barcode 86 within image 82. Although marks 89 are shown as surrounding each corner of barcode 86, marks 89 may comprise any visible indicator capable of signaling the location of barcode 86, e.g., an arrow, a box or other shape, or other type of indicator. It should be noted that barcode detection module 34 may locate barcode 86 despite the present appearance of barcode 86 within viewfinder 80. This is reflected in FIGS. 6A-6C by showing barcode 86 being of reduced quality, e.g., the pixelated grey scale and slightly skewed nature of barcode 86.

Figure 6C:
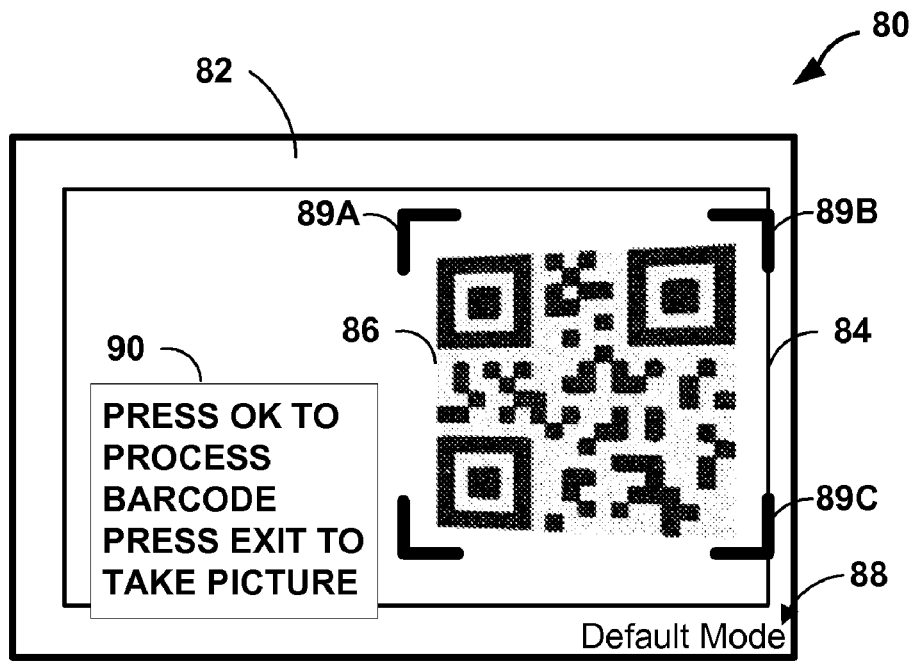
Figure 6D:
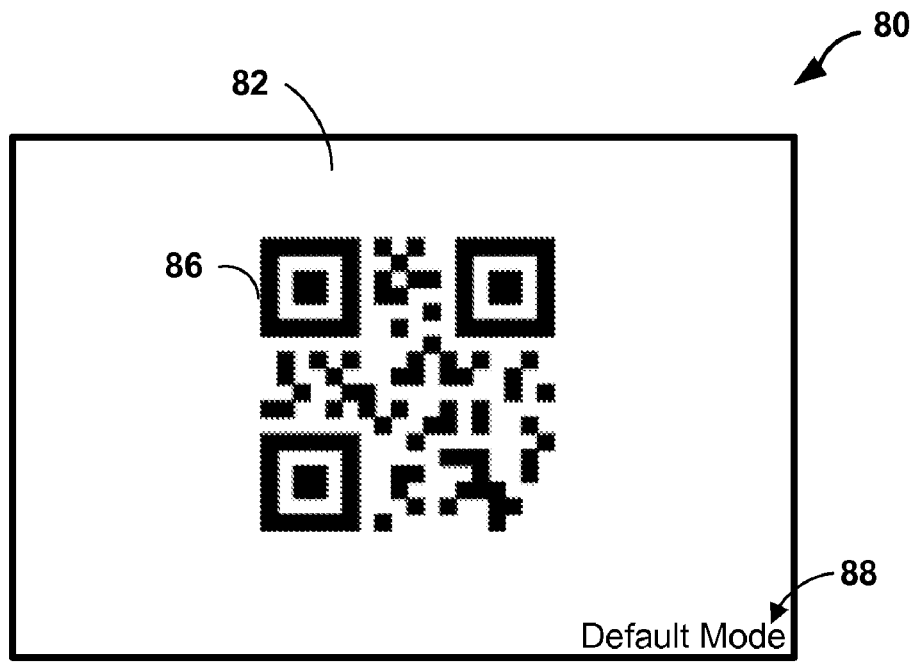

After locating barcode 86 within image 82, barcode scanner module 18, in some instances, may prompt the user before continuing to further process barcode 86. FIG. 6C shows viewfinder 80 with a user prompt 90 overlaid upon image 82. User prompt 90 is merely an exemplary user prompt and the techniques described in this disclosure need not include a user prompt or may include a different user prompt entirely. In some aspects, the user prompt may be set as a user preference by the user. User prompt 90 prompts the user to "Press OK to process the barcode" and "Press Exit to take picture," thereby indicating that if the user desires to continue processing the barcode, the user should press a button labeled "OK," and if not, press a button labeled "Exit." Both the "OK" and "Exit" buttons are again merely exemplary, and the techniques described in this disclosure should not be limited to this narrow context. The buttons may include soft keys, hard keys a touch screen button or the like. Assuming the user presses the exemplary "OK" button, FIG. 6D shows viewfinder 80 presenting the resulting image 82 of barcode 86. In instances in which a plurality of barcodes are included within the scene of interest, image capture device 10 may prompt the user via viewfinder 80 to select which of the plurality of barcodes the user is interested in scanning.

As shown in FIG. 6D, image 82 includes a clean and undistorted barcode 86, representing an image that has been cropped and processed to correct distortion, e.g., contrast and skew problems associated with the pixelated and skewed barcode 86 of previous FIGS. 6A-6C. Barcode 86 of FIG. 6D has high contrast between black and white colors and is nearly, if not perfectly, square. Thus, barcode 86 of FIG. 6D presents a uniform barcode such that a barcode decoder module may easily extract the payload encoded to barcode 86. Although described as being presented within viewfinder 80, the uniform barcode 86 of FIG. 6D may not be presented within viewfinder 80 and may instead be immediately sent to the barcode decoder discussed above.

Figure 7A:
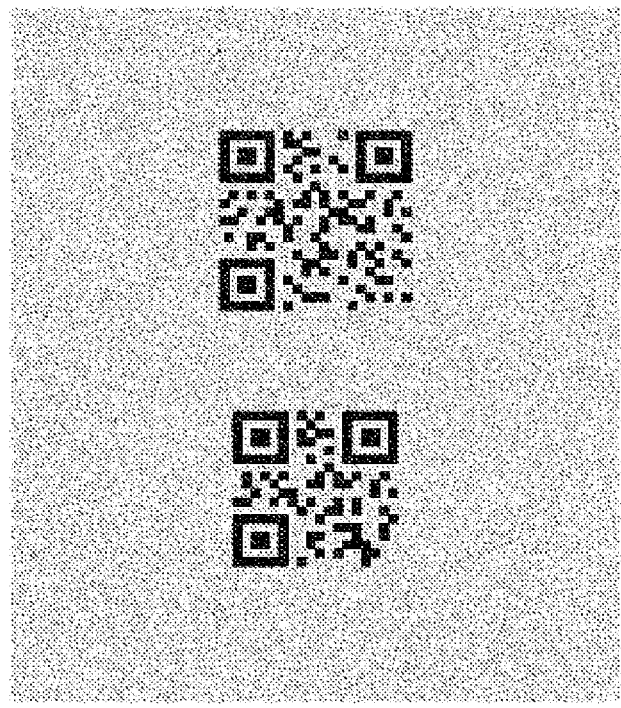
FIGS. 7A-7G are illustrations of an image during various stages of the barcode detection techniques described in this disclosure.
Figure 7B:
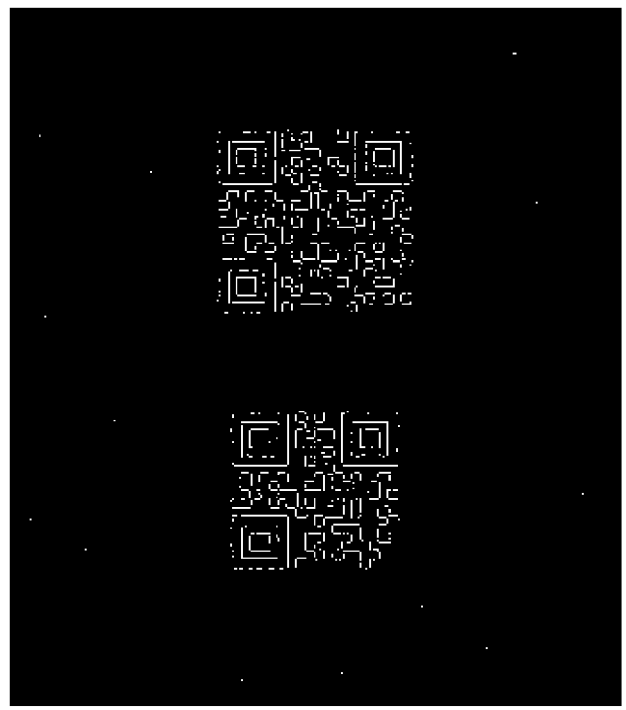

FIGS. 7A-7G are example illustrations of an image of a barcode during various stages of the barcode detection process described in this disclosure. FIG. 7A shows an example illustration of a grayscale image as initially acquired by image sensor 12, e.g., during an image preview. As described in detail above, barcode detection module 34 processes the grayscale image shown in FIG. 7A to identify edges within the image. FIG. 7B shows an example illustration of an edge map of the identified edges within the original grayscale image. The edge map represents the original image with all detail removed except for the identified edges. In the example edge map illustrated in FIG. 7B, the detected edges within the image are white, while the rest of the image is black. In other cases, however, the detected edges within the image may be black and the rest of the image white.

Figure 7C:
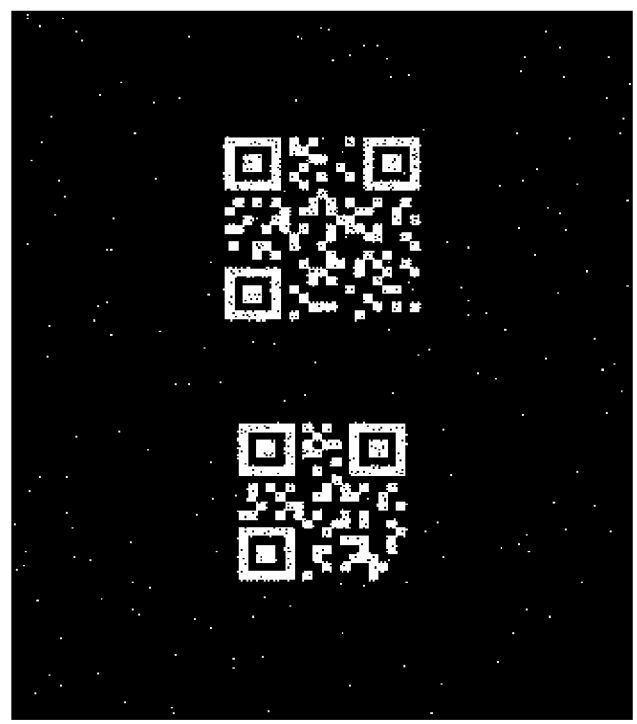

Barcode detection module 34 additionally processes the grayscale image shown in FIG. 7A to identify low intensity regions within the original grayscale image. FIG. 7C shows an example illustration of a low intensity map of the identified low intensity regions of the grayscale image. The low intensity map represents the original image with the non-low intensity regions removed. In the example low intensity map illustrated in FIG. 7C, the low intensity regions are illustrated as white and the other regions are illustrated as black. In other cases, however, the low intensity regions within the image may be black and the rest of the image white.

Figure 7D:
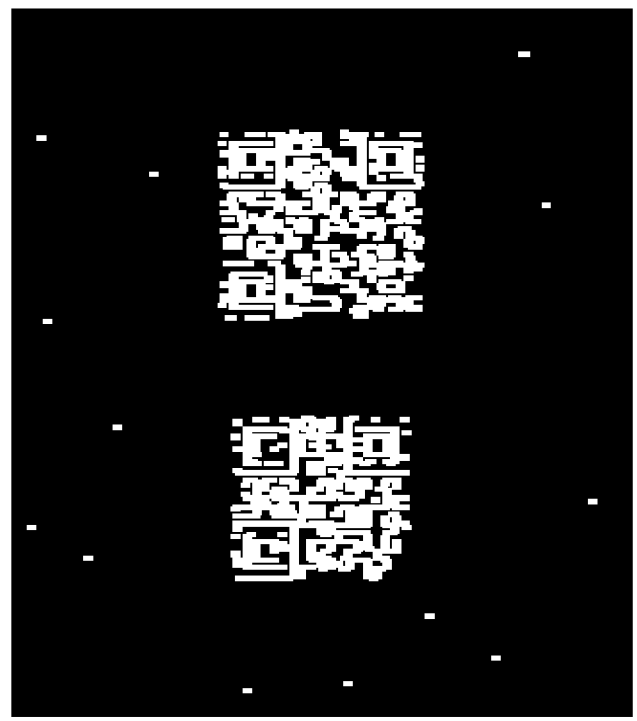
Figure 7E:
Figure 7F:
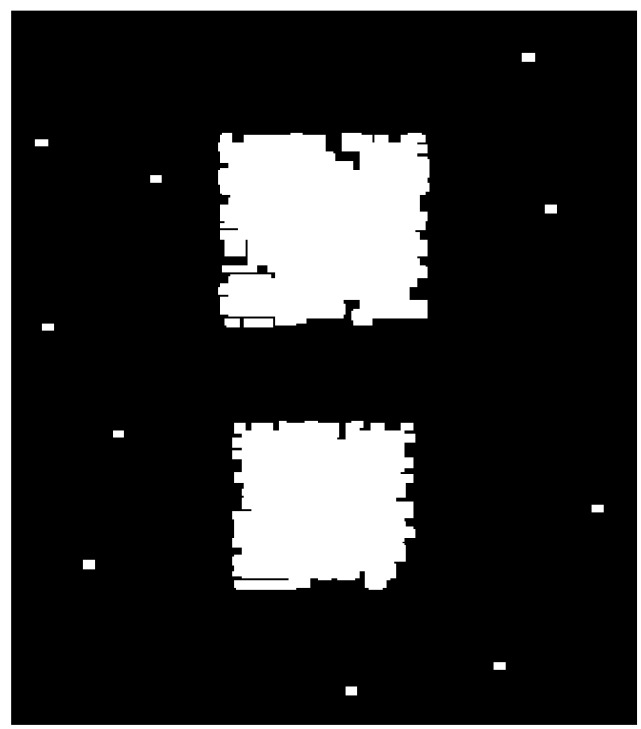

FIGS. 7D and 7E are example illustrations of the edge map and the low intensity map, respectively, after barcode detection module 34 performs dilation. FIG. 7F is an example illustration of the image generated by barcode detection module 34 after combining the dilated edge map and dilated low intensity map, performing dilation of the combined image and flood filling the dilated, combined image. As illustrated in the example illustration of FIG. 7F, several locations still remain within the image after the processing, including the barcodes. A typical scene of interest may include a number of other locations remaining in the combined image. For example, the combined image of a typical scene of interest with other background and foreground objects may include locations remaining, such as locations with text, locations that include edges of the other non-barcode objects in the scene of interest or the like.

Figure 7G:
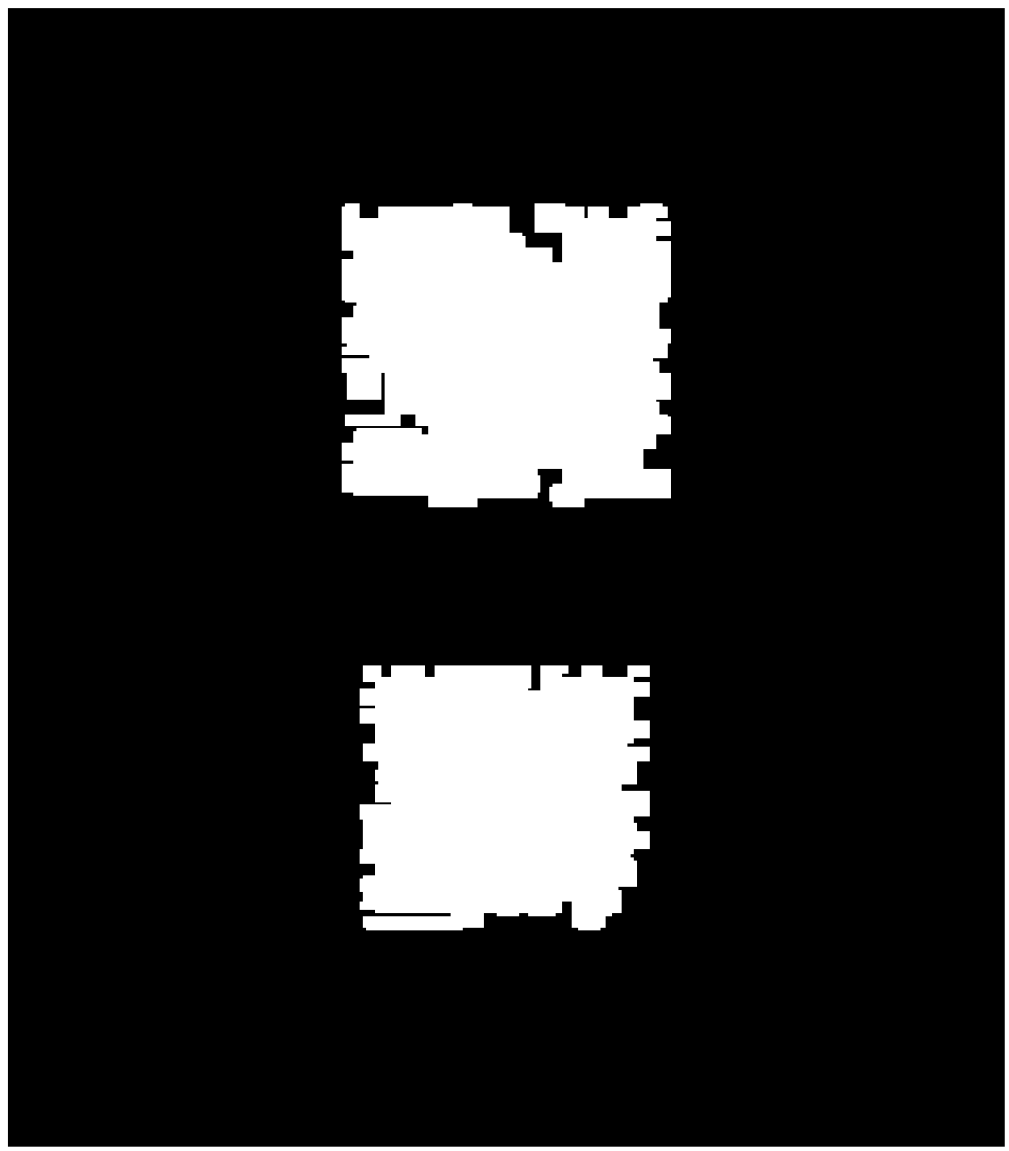

Barcode detection module 34 analyzes the locations that remain to identify locations that may potentially be barcodes. Barcode detection module 34 may compare each of the locations in the image to one or more barcode criteria, e.g., size, shape, fill factor, or the like, to determine whether the location is a candidate for being a barcode. FIG. 7G shows an example illustration of the image after barcode module 34 analyzes the locations to select candidate locations. The candidate locations remaining in the image illustrated in FIG. 7G are the two square-shaped locations, which correspond to the actual barcodes in the original grayscale image of FIG. 7A.

The techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more DSPs, general purpose microprocessors, ASICs, field programmable logic arrays FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video CODEC. Hence, the disclosure also contemplates any of a variety of integrated circuit devices that include circuitry to implement one or more of the techniques described in this disclosure. Such circuitry may be provided in a single integrated circuit chip or in multiple, interoperable integrated circuit chips.

Various aspects have been described. These and other aspects are within the scope of the following claims.

The invention claimed is:

1. A method comprising:
generating a first binary image of a scene of interest by removing image details from a digital image that are not at a transition of intensity levels;
identifying edges in the binary image based on transitions in intensity that exceed an intensity transition threshold;
identifying regions of the digital image with luminance intensity below an intensity threshold as low intensity regions;
generating a second binary image that represents the digital image with high intensity regions removed;
identifying low intensity locations within the second binary image wherein the low intensity locations exhibit a high concentration of low intensity regions;
generating a combined image based on the first binary image and the second binary image; and
detecting a barcode within the digital image at a corresponding location in the combined image that includes the identified edges and the identified low intensity locations spatially co-instantaneously.

2. The method of claim 1 further comprising:
performing at least one morphological operation on the first binary image to generate a first morphed binary image; and
performing at least one morphological operation on the second binary image to generate a second morphed binary image, wherein the generating of the combined image is based on the morphed first binary image and the morphed second binary image.

3. The method of claim 2, wherein the at least one morphological operation comprises at least one of dilation, erosion, opening and closing.

4. The method of claim 1, further comprising performing one or more morphological operations on the combined image to generate at least one location within the combined image that includes the identified edges and the identified low intensity regions spatially co-instantaneously.

5. The method of claim 1, wherein detecting the barcode within the image comprises:
identifying a location within the combined image that includes the identified edges and the identified low intensity regions spatially co-instantaneously;
determining that the identified location is a candidate location for being a barcode when the location satisfies one or more barcode criteria; and
determining that the identified location is a barcode when the scene of interest at the identified location includes a unique barcode feature.

6. The method of claim 5, wherein determining that the identified location is a candidate location for being a barcode is based on at least one of a shape of the identified location, a size of the identified location or a fill factor of the identified location.

7. The method of claim 5, wherein determining that the identified location is a barcode when the scene of interest at the identified location includes a unique barcode feature comprises determining that the identified location is a barcode upon detecting a barcode finder pattern within the scene of interest at the identified location, wherein the barcode finder pattern comprises either nested alternating dark and light squares at three corners of the identified location, or two perpendicular lines made up of alternating black and white square modules.

8. A device comprising
a processor including a barcode detection module that
identifies edges in a digital image of a scene of interest by generating a first binary image that represents the digital image with all detail removed except for identified edges, wherein edges are determined based on transitions in intensity that exceed an intensity transition threshold,
identifies regions of the digital image with luminance intensity below an intensity threshold as low intensity regions,
identifies low intensity locations within the digital image by generating a second binary image that represents the digital image with high intensity regions removed, wherein the low intensity locations exhibit a high concentration of low intensity regions,
generates a combined image based on the first binary image and the second binary image; and
detects a barcode within the digital image at a corresponding location within the combined image that includes the identified edges and the identified low intensity locations spatially co-instantaneously.

9. The device of claim 8, wherein the barcode detection module also:
performs at least one morphological operation on the first binary image to generate a first morphed binary image,
performs at least one morphological operation on the second binary image to generate a second morphed binary image wherein the generating of the combined image is based on the morphed first binary image and the morphed second binary image.

10. The device of claim 9, wherein the at least one morphological operation comprises at least one of dilation, erosion, opening and closing.

11. The device of claim 8, wherein the barcode detection module performs one or more morphological operations on the combined image to generate at least one location within the image that includes the identified edges and the identified low intensity regions spatially co-instantaneously.

12. The device of claim 8, wherein the barcode detection module determines that the identified location is a candidate location for being a barcode when the location satisfies one or more barcode criteria and determines that the identified location is a barcode when the scene of interest at the identified location includes a unique barcode feature.

13. The device of claim 12, wherein the barcode detection module determines that the identified location is a candidate location for being a barcode based on at least one of a shape of the identified location, a size of the identified location or a fill factor of the identified location.

14. The device of claim 12, wherein the barcode detection module determines that the identified location is a barcode upon detecting a barcode finder pattern within the scene of interest at the identified location, wherein the barcode finder pattern comprises either nested alternating dark and light squares at three corners of the identified location, or two perpendicular lines made up of alternating black and white square modules.

15. The device of claim 8, wherein the device comprises a wireless communication device.

16. The device of claim 8, wherein the device comprises an integrated circuit device.

17. A non-transitory computer-readable medium comprising instructions to cause a processor to:
identify edges in a digital image of a scene of interest by generating a first binary image that represents the digital image with all detail removed except for identified edges, wherein edges are determined based on transitions in intensity that exceed an intensity transition threshold;
identify regions of the digital image with luminance intensity below an intensity threshold as low intensity regions;
identify low intensity locations within the digital image by generating a second binary image that represents the image with high intensity regions removed, wherein the low intensity locations exhibit a high concentration of low intensity regions;
generate a combined image based on the first binary image and the second binary image; and
detect a barcode within the digital image at a corresponding location within the combined image that includes the identified edges and the identified low intensity locations spatially co-instantaneously.

18. The computer-readable medium of claim 17, wherein instructions to cause the processor to detect the barcode at a location within the digital image that includes the identified edges and the identified low intensity locations spatially co-instantaneously further comprise instructions to cause the processor to:
perform at least one morphological operation on the first binary image; and
perform at least one morphological operation on the second binary image.

19. The computer-readable medium of claim 18, wherein the at least one morphological operation comprises at least one of dilation, erosion, opening and closing.

20. The computer-readable medium of claim 17, further comprising instructions to cause the processor to perform one or more morphological operations on the combined image to generate at least one location within the combined image that includes the identified edges and the identified low intensity regions spatially co-instantaneously.

21. The computer-readable medium of claim 17, wherein instructions to cause the processor to detect the barcode within the image comprise instructions to cause the processor to:
identify a location within the image that includes the identified edges and the identified low intensity regions spatially co-instantaneously;
determine that the identified location is a candidate location for being a barcode when the location satisfies one or more barcode criteria; and
determine that the identified location is a barcode when the scene of interest at the identified location includes a unique barcode feature.

22. The computer-readable medium of claim 21, wherein instructions to cause the processor to determine that the identified location is a candidate location for being a barcode comprise instructions to cause the processor to determine that the identified location is a candidate location for being a barcode based on the one or more barcode criteria including at least one of a shape of the identified location, a size of the identified location and a fill factor of the identified location.

23. The computer-readable medium of claim 21, wherein instructions to cause the processor to determine that the identified location is a barcode when the scene of interest at the identified location includes a unique barcode feature comprise instructions to cause the processor to determine that the identified location is a barcode upon detecting a barcode finder pattern within the scene of interest at the identified location, wherein the barcode finder pattern comprises either nested alternating dark and light squares at three corners of the identified location, or two perpendicular lines made up of alternating black and white square modules.

24. A device comprising:
means for identifying edges in a digital image of a scene of interest by generating a first binary image that represents a digital image of a scene of interest with all detail removed except for identified edges, wherein edges are determined based on transitions in intensity that exceed an intensity transition threshold;
means for identifying regions of the digital image with luminance intensity below an intensity threshold as low intensity regions;
means for identifying low intensity locations within the image by generating a second binary image that represents the digital image with high intensity regions removed, wherein the low intensity locations exhibit a high concentration of low intensity regions;
means for generating a combined image based on the first binary image and the second binary image; and
means for detecting a barcode within the digital image at a corresponding location within the combined image that includes the identified edges and the identified low intensity locations spatially co-instantaneously.

25. The device of claim 24, further comprising:
means for performing at least one morphological operation on the first binary image to generate a first morphed binary image;
means for performing at least one morphological operation on the second binary image to generate a second morphed binary image,
wherein the means for generating the combined image generates the combined image based, at least in part, on the first morphed binary image and the second morphed binary image.

26. The device of claim 25, wherein the at least one morphological operation comprises at least one of dilation, erosion, opening and closing.

27. The device of claim 24, further comprising means for performing one or more morphological operations on the combined image to generate at least one location within the image that includes the identified edges and the identified low intensity regions spatially co-instantaneously.

28. The device of claim 24, wherein the detecting means identify a location within the image that includes the identified edges and the identified low intensity regions spatially co-instantaneously, determine that the identified location is a candidate location for being a barcode when the location satisfies one or more barcode criteria, and determine that the identified location is a barcode when the scene of interest at the identified location includes a unique barcode feature.

29. The device of claim 27, wherein the detecting means determine that the identified location is a candidate location for being a barcode based on at least one of a shape of the identified location, a size of the identified location and a fill factor of the identified location.

30. The device of claim 27, wherein the detecting means determines that the identified location is a barcode upon detecting a barcode finder pattern within the scene of interest at the identified location, wherein the barcode finder pattern comprises either nested alternating dark and light squares at three corners of the identified location, or two perpendicular lines made up of alternating black and white square modules.

* * * * *